Patented Aug. 18, 1953

2,649,448

UNITED STATES PATENT OFFICE 2,649,448

4-AMINO-5-BENZYLPYRIMIDINE COMPOUNDS

Aaron S. Goldberg, New York, N. Y., assignor to Nepera Chemical Co., Inc., Yonkers, N. Y., a corporation of New York No Drawing. Application April 3, 1952,
Serial No. 280,394

3 Claims. (Cl. 260—256.4)

This invention relates to the preparation of certain novel pyrimidine compounds and relates more particularly to the production of certain 2-substituted-4-amino-5-benzyl-pyrimidines.

Compounds containing a pyrimidine nucleus are of wide pharmacological interest since compounds containing the basic pyrimidine structure are known to play an important part in physiological processes. Compounds containing the pyrimidine structure are present in the cell nucleus in the form of nucleoproteins. Vitamin $B_1$, folic acid, and thymine are other important natural substances of pyrimidine structure. Although the study of the physiologically active pyrimidine compounds has occupied the attention of many investigators, the usefulness of many compounds which come within the broad class of pyrimidine compounds has by no means been fully determined since it is well known that relatively small changes in the structure of pyrimidine compounds have been found to exert widely different physiological effects.

It is, therefore, an important object of my invention to provide certain novel 2-substituted-4-amino-5-benzylpyrimidine compounds having desirable physiological activity.

Another object of my invention is the provision of certain novel physiologically active 2-substituted-4-amino-5-benzylpyrimidines which may be obtained from available or readily synthesized intermediates.

Other objects of this invention will appear from the following detailed description.

The novel pyrimidine compounds of my invention may be represented by the following general formula

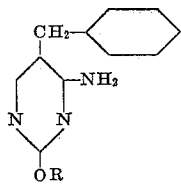

wherein R is hydrogen or an alkyl group containing from one to six carbon atoms.

The novel compounds of my invention may be prepared by condensing ethyl hydrocinnamate

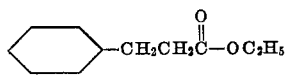

with ethyl formate so as to obtain the intermediate compound ethyl α-formyl hydrocinnamate.

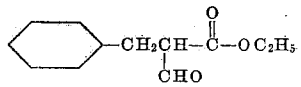

The above compound may then be reacted with urea, for example, in alcoholic solution and in the presence of some hydrogen chloride to yield ethyl α-benzyl β-ureido acrylate:

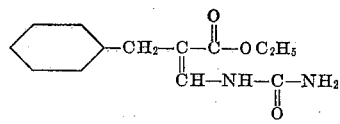

Upon heating the above compound in the presence of a base, such as, for example, 10% aqueous sodium hydroxide, ring closure takes place with the formation of 5-benzyl uracil. Treatment of the 5-benzyl uracil with phosphorus oxychloride yields 2,4-dichloro-5-benzylpyrimidine. By reaction of the latter compound with ammonia, under controlled conditions, the 4-chloro group is replaced by an amino group yielding 2-chloro-4-amino-5-benzylpyrimidine. Hydrolysis of the 2-chloro group introduces a hydroxy group in the 2-position. By reacting 2-hydroxy-4-amino-5-benzylpyrimidine with sodium methoxide, sodium ethoxide, sodium propoxide, sodium isopropoxide or sodium butoxide, my novel 2-alkoxy-4-amino-5-benzylpyrimidines are obtained.

In order further to illustrate my invention, but without being limited thereto, the following examples are given:

*Example I*

67 parts by weight of sodium metal and 2 parts by weight of potassium metal are placed in a reaction vessel, sufficient toluene added to cover the metal and the mixture then heated with some agitation until the sodium and potassium are melted. The toluene is then decanted from the molten alloy and a mixture of 375 parts by weight of ethyl hydrocinnamate, 350 parts by weight of ethyl formate and 850 parts by weight of diethyl ether are gradually added to the sodium-potassium alloy. The addition is made under reflux and at a rate sufficient to maintain the exothermic reaction mixture at a lively boil. Hydrogen is given off as a reaction product. When the addition of the ester mixture is completed and the evolution of hydrogen ceases, the reaction mixture is allowed to reflux for a period of about 1 hour. The mixture is poured on to ice, the aqueous phase separated from the ether phase, and, after washing the ether phase once with dilute aqueous sodium hydroxide, the ether phase is discarded. The aqueous sodium hydroxide phases are combined, acidified with cold hydrochloric acid and the combined acidified aqueous phase then extracted with ether. The ether layer is separated and the ether evaporated under reduced pressure. The formyl ester is then distilled under a pressure of 1 mm. or less. A yield of 70% of ethyl α-formyl hydrocinnamate is obtained as the product.

100 parts by weight of the ethyl α-formyl hydrocinnamate thus obtained are added to a mixture containing 35 parts by weight of urea, 235 parts by weight of absolute ethyl alcohol and 6 parts by weight of ethyl alcohol which has been saturated with hydrogen chloride at 20° C. The mixture thus formed is heated at 50–60° C. for about one hour and, after being allowed to stand at a temperature of about 40° C. for about 12–20 hours, followed by standing for about 16 hours at a temperature of 0–5° C., ethyl α-benzyl β-ureido acrylate crystallizes out. The crystals are filtered, washed with 50% aqueous ethyl alcohol and then with a small amount of ether.

32 parts by weight of the ethyl α-benzyl β-ureido acrylate are placed in a suitable reaction vessel and 54 parts by weight of a 2 N aqueous solution of sodium hydroxide are added. Heating is continued at the boiling point for about 30 minutes. The mixture is acidified with warmed 2 N aqueous hydrochloric acid. A precipitate of 5-benzyluracil is obtained on acidification. The mixture is cooled, the 5-benzyluracil is filtered off and the latter then washed with water and dried. The 5-benzyluracil may then be converted to 2,4-dichloro-5-benzylpyrimidine by reacting the former with an excess phosphorus oxychloride under reflux for about 3 hours. To separate the 2,4-dichloro-5-benzylpyrimidine, the reaction mixture is reduced in volume by heating under reduced pressure until it becomes slightly syrupy. The syrupy liquid is then diluted with some chloroform, ice is added and, after agitation, the aqueous and chloroform phases are separated. The chloroform layer is washed several times with ice water and dried with sodium sulfate. After boiling off the chloroform, 2,4-dichloro-5-benzylpyrimidine is obtained and may be further purified by distillation under vacuum. This compound has a boiling point of 160° C. under 1 mm. pressure.

*Example II*

5 parts by weight of 2,4-dichloro-5-benzylpyrimidine are placed in a reaction vessel provided with cooling means, the contents cooled to about 0° C., and after 9 parts by weight of absolute ethyl alcohol saturated with ammonia at 0–5° C. are introduced, the vessel is sealed and the temperature permitted to rise slowly to 18–25° C. The reaction mixture is allowed to remain at this temperature for about 24 hours. A 1% by weight solution of aqueous ammonia is added until precipitation of the 2-chloro-4-amino-5-benzylpyrimidine formed is complete. The precipitate is filtered off and washed with water. The product may then be recrystallized from benzene. A yield of 94% of theory of 2-chloro-4-amino-5-benzylpyrimidine is obtained, the product melting at 162° C.

*Example III*

0.1 part by weight of 2-chloro-4-amino-5-benzylpyrimidine is dissolved in 2 parts by weight of 1 N aqueous sulfuric acid and the solution heated to boiling for three hours. The solution is then cooled and brought to neutrality by the addition of aqueous sodium hydroxide. The neutralized solution is cooled to a temperature of 0° C. for 4 hours and the precipitate which forms is filtered off, washed well with water, then with ethyl alcohol, acetone and finally with diethyl ether. A yield of 74% of theory of 2-hydroxy-4-amino-5-benzylpyrimidine is obtained. This compound melts at 315° C. with decomposition.

*Example IV*

0.1 part by weight of 2-chloro-4-amino-5-benzylpyrimidine is dissolved in 1.6 parts by weight of a solution of sodium ethoxide containing 0.7 part by weight of sodium for each 80 parts by weight of absolute ethyl alcohol. The reaction mixture is heated to boiling for about two hours and the major part of the alcohol is then driven off. Upon the addition of 1 part by weight of water and 1 part by weight of diethyl ether, the 2-ethoxy-4-amino-5-benzylpyrimidine formed crystallizes out directly. The crystalline product is filtered off and washed with some water. The product may be recrystallized from a 70% by weight aqueous solution of ethyl alcohol. A yield of 82% of theory of 2-ethoxy-4-amino-5-benzylpyrimidine is obtained melting at 127° C.

In a similar way, the corresponding 2-methoxy, 2-propoxy and 2-butoxy-4-amino-5-benzylpyrimidines are obtained.

It is to be understood that the foregoing detailed description is given merely by way of illustration and that many variations may be made therein without departing from the spirit of my invention.

Having described my invention, what I desire to secure by Letters Patent is:

What I claim is:

1. The pyrimidine compounds of the following formula:

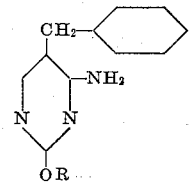

wherein R is a member of the group consisting of hydrogen and alkyl groups containing from 1 to 6 carbon atoms.

2. 2-hydroxy-4-amino-5-benzylpyrimidine.
3. 2-ethoxy-4-amino-5-benzylpyrimidine.

AARON S. GOLDBERG.

No references cited.